July 4, 1967 J. J. KLINIKOWSKI 3,329,834
SEMICONDUCTOR COUNTER CIRCUIT
Filed Oct. 8, 1964
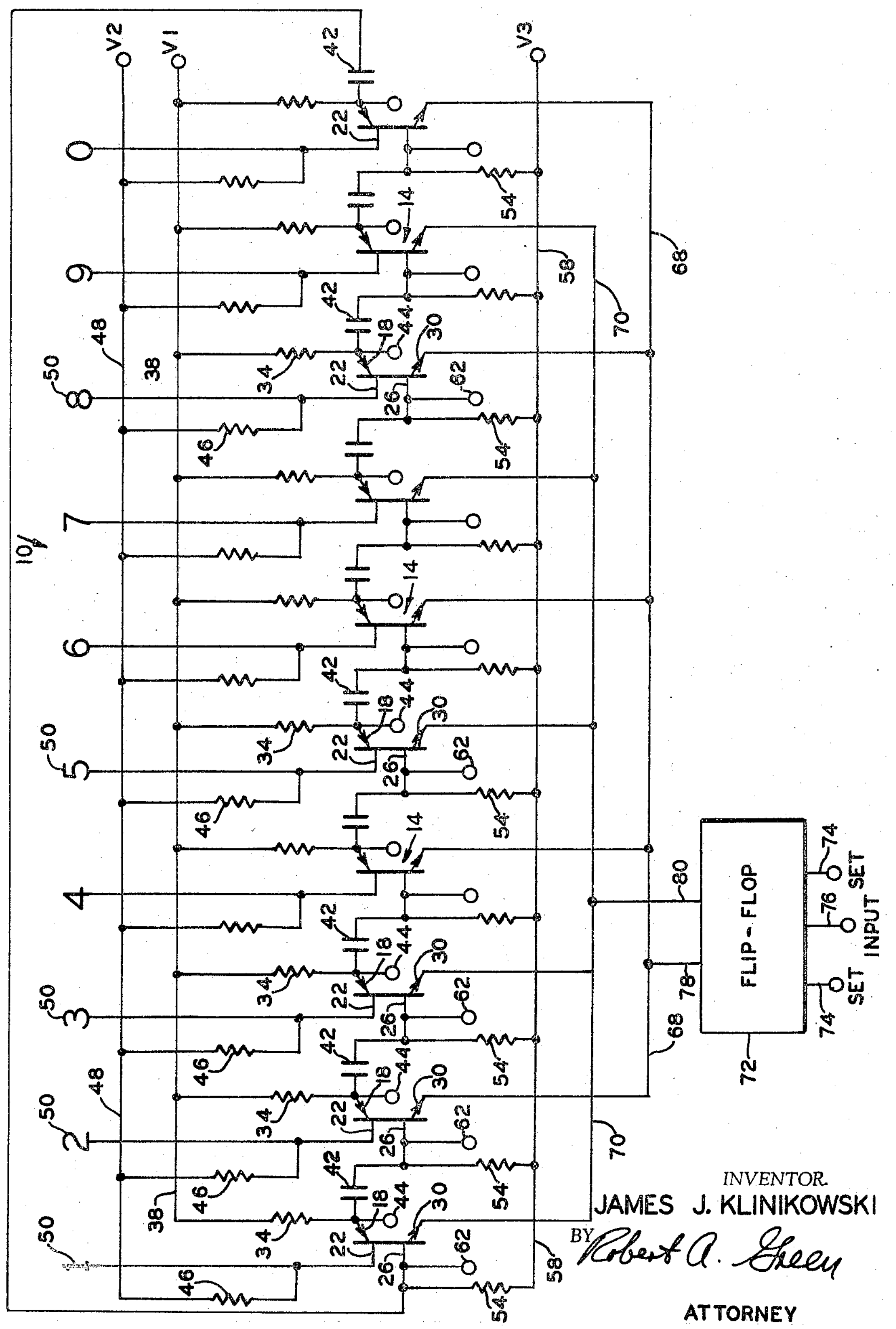
INVENTOR.
JAMES J. KLINIKOWSKI
BY Robert A. Green
ATTORNEY

United States Patent Office 3,329,834

Patented July 4, 1967

3,329,834

SEMICONDUCTOR COUNTER CIRCUIT

James J. Klinikowski, Somerville, N.J., assignor to Burroughs Corporation, Detroit, Mich., a corporation of Michigan Filed Oct. 8, 1964, Ser. No. 402,518
3 Claims. (Cl. 307—88.5)

This invention relates to circuits such as ring counters, shift registers, and the like which use multiple-element semiconductor devices as the basic components thereof.

The present invention utilizes, as its basic circuit element, a four-element semiconductor device known as a silicon controlled switch (SCS). Devices of this type have been available commercially for a relatively short time, and their use in a circuit such as a ring counter or shift register or the like presents problems for which the prior art provides no solution.

Accordingly, the objects of the invention concern the provision of a new and novel circuit using multiple-element semiconductor devices as the basic components thereof.

Briefly, a circuit embodying the invention includes a plurality of multiple-element semiconductor devices coupled together in a series to operate as a counter, shift register, or the like. Each device includes, among other things, an input electrode by means of which driving signals are applied to the circuit to perform the required function. According to the invention, the input electrodes are connected in two groups, with alternate electrodes being connected in each group. Thus, the devices which occupy even-numbered positions in the series have their input electrodes connected together, and devices which occupy odd-numbered positions in the series have their inputs connected together. A flip-flop having two outputs is connected to the inputs of the semiconductor devices, with one output being connected to one group of input electrodes and the other output being connected to the other group of input electrodes. With this arrangement, each change of state of the flip-flop causes a count or registered pulse to be transmitted from one device to only the next device. The count can thus move by only one position with each change of state of the flip-flop.

The invention is described in greater detail by reference to the drawing wherein the single figure is a schematic representation of a counter circuit embodying the invention.

The circuit 10, shown to illustrate the principles of the invention, is a ten-position ring counter including ten semiconductor devices 14. Of course, more than ten positions and devices could be employed, if desired. Each device 14 includes a plurality of zones of semiconductor material separated by PN junctions. One suitable device of this type has four zones of semiconductor material, either PNPN or NPNP, with the zones being separated from each other by PN junctions and with an external electrode connected to each zone. This type of device is known as a silicon controlled switch or SCS device. Each SCS device, shown schematically in the drawing, includes, in order, an anode zone 18, an anode gate 22 which controls the anode zone, a cathode gate 26 which controls the last zone, the cathode zone 30. In the following description, the leads which are connected to these zones carry the same names as the zones to which they are attached.

In each device 14, the anode 18 is connected through a resistor 34 to a bus 38 which is connected in turn to a positive D.C. power source V1. The anode 18 is also coupled through a capacitor 42 to the cathode gate 26 of the next adjacent leading device 14 in the counting series. The anode is also provided with an output terminal 44. The anode gate 22 is coupled through a resistor 46 to a bus 48 which is coupled in turn to a positive D.C. power source V2. The anode gate 22 is also coupled to a utilization device, such as a count indicator, for example, a cathode indicator electrode 50 in a type 6844A indicator tube. The cathode gate 26 is coupled through a resistor 54 to a bus 58 which is connected in turn to a negative D.C. power source V3. The cathode gate 26 is also provided with a terminal 62 to which positive reset pulses may be applied from a suitable pulse source (not shown). In the ring counter 10, the anode of the SCS device 18 at the "0" position is coupled to the cathode gate of the SCS device at the "1" position.

According to the invention, the cathode electrodes 30 are connected in two sets, with the cathode electrodes of the SCS devices at the even-numbered positions being in one set, and the cathode electrodes of the SCS devices at the odd-numbered positions being in the second set. The cathode electrodes of the first set are connected to a common bus 68, and the cathode electrodes of the second set are connected to a common bus 70.

The circuit 10 includes means for controlling the operation of the ring counter, and this means comprises a flip-flop 72 coupled to the sets of cathode electrodes 30. The flip-flop may be of any suitable type and need not be shown in detail. The flip-flop includes two discharge devices, such as tubes or transistors (not shown), a set input 74 to each discharge device to set the flip-flop in a desired state, an input 76 for applying counting pulses thereto, and two output leads 78 and 80. One output lead, lead 78, is connected to cathode bus 68, and the other output lead 80 is connected to cathode bus 70.

In operation of the ring counter of the invention, the counter is set in operation by means of the application of a positive reset pulse to terminal 62 of the cathode gate of one of the SCS devices 14. Ordinarily, one would set the device 14 at the "0" position. This device is thus turned on, and the "0" cathode electrode is caused to glow. The same or a similar reset pulse is also applied to the flip-flop 72 to set it to provide the required relative output potentials on the output leads 78 and 80 and on the two cathode buses 68 and 70. The first input pulse which is applied to the flip-flop through terminal 76 causes the flip-flop to change state so that the potential on the output leads 78 and 80 are reversed. The arrange- is such that a negative potential is applied to the SCS device 14 at the "0" position and to all of the other devices at the even-numbered positions. Thus, the device 14 at the "0" position is turned off. As this device turns off, the anode electrode 18 thereof rises to a positive potential which is coupled through the capacitor 42 to the cathode gate 26 of the adjacent leading device 14 at the "1" position in the series. This device is thus caused to turn on, and the cathode numeral "1" is caused to glow. The next input counting pulse applied to the flip-flop causes the flip-flop to change state and to reverse the output potentials applied to the cathode buses 68 and 70. Now the "1" device is turned off, and it, in turn, causes the "2" device to turn on. Thus, with each application of an input pulse to the flip-flop 72, a count is transferred by only one position in the counter. This is insured by the coupling of the flip-flop outputs to the two separate sets of cathode electrodes of the devices 14. Thus, a critically shaped and timed input pulse is not required to operate the counter and register one count at a time.

What is claimed is:

1. A semiconductor circuit including
   a plurality of multiple-zone semiconductor devices coupled together in series with each device occupying either an even-numbered or odd-numbered position in the series, each device including four electrodes, an anode electrode which is an output electrode and is used to couple one device to the next in the series, an anode gate electrode, a cathode electrode which receives counting pulses and thereby controls the operation of the device, and a cathode gate electrode which operates in the nature of an input electrode and is coupled to the anode electrode of the device which precedes it in the series, said cathode electrodes being connected in two sets with the cathode electrodes of the even-numbered devices being in one set and the cathode electrodes of the odd-numbered devices being in the other set, and a flip-flop having an input for receiving control pulses and two outputs, one output being connected to one set of cathode electrodes and the other output being connected to the other set of cathode electrodes so that each time the flip-flop changes state and the potentials on its outputs change, a semiconductor device is turned off and the next one in the series is turned on.

2. The circuit defined in claim 1 and including means coupled to the cathode gate electrode of each device and to said flip-flop for setting the flip-flop and one of said devices to an initial condition which serves as an operating starting point for the series of devices.

3. The circuit defined in claim 1 and including means coupled to the cathode gate electrode of each device and to said flip-flop for setting the flip-flop and one of said devices to an initial condition which serves as an operating starting point for the series of devices, and means coupled to said flip-flop for applying thereto counting pulses, each of which causes the registering of the counts to proceed along the series from one device to the next.

References Cited

UNITED STATES PATENTS 3,168,657 2/1965 Wells ............. 307—88.5

ARTHUR GAUSS, *Primary Examiner.*

D. D. FORRER, *Assistant Examiner.*